US011763284B2

(12) United States Patent
Malhotra et al.

(10) Patent No.: US 11,763,284 B2
(45) Date of Patent: Sep. 19, 2023

(54) SYSTEM AND METHOD OF TOKENIZING DEPOSIT ACCOUNT NUMBERS FOR USE AT PAYMENT CARD ACCEPTANCE POINT (71) Applicant: MasterCard International Incorporated, Purchase, NY (US)

(72) Inventors: Sandeep Malhotra, Greenwich, CT (US); Shanthan Subramaniam, Baldwin Place, NY (US); Dana J Lorberg, St. Louis, MO (US)

(73) Assignee: Mastercard International Incorporated, Purchase, NY (US)

(*) Notice: Subject to any disclaimer, the term of this patent is extended or adjusted under 35 U.S.C. 154(b) by 733 days.

(21) Appl. No.: 15/622,337

(22) Filed: Jun. 14, 2017

(65) Prior Publication Data
US 2017/0364880 A1 Dec. 21, 2017

Related U.S. Application Data (60) Provisional application No. 62/351,164, filed on Jun. 16, 2016, provisional application No. 62/350,821,
(Continued)

(51) Int. Cl.
*G06Q 20/20* (2012.01)
*G06Q 20/02* (2012.01)
(Continued)

(52) U.S. Cl.
CPC ......... *G06Q 20/204* (2013.01); *G06Q 20/023* (2013.01); *G06Q 20/027* (2013.01);
(Continued)

(58) Field of Classification Search
None
See application file for complete search history.

(56) References Cited

U.S. PATENT DOCUMENTS 5,892,900 A * 4/1999 Ginter .................. G06Q 20/02
726/26
6,505,772 B1 * 1/2003 Mollett ................. G07F 7/1008
235/379
(Continued)

FOREIGN PATENT DOCUMENTS

CN 104252675 A 12/2014
CN 104717628 A 6/2015
(Continued)

OTHER PUBLICATIONS

H. Harb, H. Farahat and M. Ezz, "SecureSMSPay: Secure SMS Mobile Payment model," 2008 2nd International Conference on Anti-counterfeiting, Security and Identification, 2008, pp. 11-17, doi: 10.1109/IWASID.2008.4688346. (Year: 2008).*
(Continued)

*Primary Examiner* — Jacob C. Coppola
*Assistant Examiner* — Eduardo Castilho
(74) *Attorney, Agent, or Firm* — Buckley, Maschoff & Talwalkar LLC (57) ABSTRACT A method of routing a payment transaction includes receiving a transaction request message. The message includes a payment token that was previously issued to an account holder. The payment token is translated into a funding account indicator. The funding account indicator is in a format defined for payment card account numbers in a payment account system. The funding account indicator is translated into a bank account number. The bank account number identifies a bank deposit account owned by the account holder. An EFT message is transmitted to initiate an EFT transaction to be funded from the bank deposit account owned by the account holder. The EFT message includes the bank account number.

10 Claims, 7 Drawing Sheets

Related U.S. Application Data filed on Jun. 16, 2016, provisional application No. 62/350,831, filed on Jun. 16, 2016, provisional application No. 62/351,016, filed on Jun. 16, 2016, provisional application No. 62/351,227, filed on Jun. 16, 2016, provisional application No. 62/351,155, filed on Jun. 16, 2016, provisional application No. 62/350,407, filed on Jun. 15, 2016, provisional application No. 62/350,335, filed on Jun. 15, 2016, provisional application No. 62/350,322, filed on Jun. 15, 2016, provisional application No. 62/350,416, filed on Jun. 15, 2016.

(51) Int. Cl.

| | |
|---|---|
| *G06Q 20/34* | (2012.01) |
| *G06Q 20/10* | (2012.01) |
| *G06Q 20/38* | (2012.01) |
| *G06Q 20/32* | (2012.01) |
| *G06Q 20/40* | (2012.01) |
| *G06Q 40/02* | (2023.01) |
| *G06Q 20/36* | (2012.01) |
| *G06Q 10/107* | (2023.01) |

(52) U.S. Cl.
CPC ........... *G06Q 20/10* (2013.01); *G06Q 20/102* (2013.01); *G06Q 20/105* (2013.01); *G06Q 20/108* (2013.01); *G06Q 20/202* (2013.01); *G06Q 20/322* (2013.01); *G06Q 20/325* (2013.01); *G06Q 20/3221* (2013.01); *G06Q 20/34* (2013.01); *G06Q 20/341* (2013.01); *G06Q 20/36* (2013.01); *G06Q 20/385* (2013.01); *G06Q 20/387* (2013.01); *G06Q 20/40* (2013.01); *G06Q 20/401* (2013.01); *G06Q 20/405* (2013.01); *G06Q 20/4012* (2013.01); *G06Q 20/4016* (2013.01); *G06Q 40/02* (2013.01); *G06Q 10/107* (2013.01); *G06Q 2220/00* (2013.01)

(56) References Cited

U.S. PATENT DOCUMENTS

| | | | | |
|---|---|---|---|---|
| 6,636,833 B1* | 10/2003 | Flitcroft | ........... | G06Q 20/3552 705/64 |
| 6,658,568 B1* | 12/2003 | Ginter | ........... | G06Q 20/02 348/E5.006 |
| 8,332,325 B2* | 12/2012 | Faith | ........... | G06Q 20/40 705/50 |
| 8,352,370 B1* | 1/2013 | White | ........... | G06Q 40/02 705/38 |
| 8,676,708 B1* | 3/2014 | Honey | ........... | G06Q 40/02 705/16 |
| 8,768,830 B1* | 7/2014 | Jorgensen | ........... | G06Q 20/341 705/40 |
| 9,183,480 B1* | 11/2015 | Quigley | ........... | G06K 19/07707 |
| 9,760,871 B1* | 9/2017 | Pourfallah | ........... | G06Q 20/02 |
| 11,250,424 B2* | 2/2022 | Wong | ........... | G06Q 20/367 |
| 11,429,975 B1* | 8/2022 | Asefi | ........... | G06Q 20/34 |
| 11,501,581 B2* | 11/2022 | Hammad | ........... | G06Q 20/3278 |
| 2003/0126094 A1* | 7/2003 | Fisher | ........... | G06Q 20/02 705/75 |
| 2004/0010462 A1* | 1/2004 | Moon | ........... | G06Q 20/357 705/39 |
| 2005/0192901 A1* | 9/2005 | McCoy | ........... | G06Q 20/4037 705/40 |
| 2005/0246289 A1* | 11/2005 | Alexander | ........... | G06Q 20/023 705/67 |
| 2006/0006226 A1* | 1/2006 | Fitzgerald | ........... | G06Q 20/32 235/380 |
| 2006/0123234 A1 | 6/2006 | Schmidt et al. | | |
| 2006/0213978 A1* | 9/2006 | Geller | ........... | G06Q 20/10 235/380 |
| 2008/0015988 A1* | 1/2008 | Brown | ........... | G06Q 20/40 705/44 |
| 2008/0308624 A1* | 12/2008 | Gardner | ........... | G06Q 20/341 235/380 |
| 2009/0228370 A1* | 9/2009 | Shakkarwar | ........... | G07F 7/1025 705/26.1 |
| 2010/0228672 A1 | 9/2010 | Karim | | |
| 2011/0055077 A1* | 3/2011 | French | ........... | G06Q 20/3255 705/39 |
| 2011/0153498 A1* | 6/2011 | Makhotin | ........... | G06Q 20/3278 705/44 |
| 2011/0208600 A1* | 8/2011 | Aharoni | ........... | G06Q 20/3274 705/16 |
| 2012/0016799 A1 | 1/2012 | Killian et al. | | |
| 2012/0024946 A1* | 2/2012 | Tullis | ........... | G06Q 20/042 235/379 |
| 2012/0116902 A1* | 5/2012 | Cardina | ........... | G06Q 20/10 705/17 |
| 2012/0209774 A1* | 8/2012 | Fraher | ........... | G06Q 20/10 705/44 |
| 2013/0018779 A1* | 1/2013 | Laquerre | ........... | G06Q 40/02 705/39 |
| 2013/0036000 A1* | 2/2013 | Giordano | ........... | G06Q 40/02 705/14.27 |
| 2013/0060708 A1* | 3/2013 | Oskolkov | ........... | G06Q 20/10 705/75 |
| 2013/0110658 A1* | 5/2013 | Lyman | ........... | G06Q 20/36 705/41 |
| 2013/0110719 A1 | 5/2013 | Carter et al. | | |
| 2013/0117138 A1 | 5/2013 | Hazel et al. | | |
| 2013/0124292 A1* | 5/2013 | Juthani | ........... | G06Q 20/4012 705/14.26 |
| 2013/0151402 A1* | 6/2013 | Howard | ........... | G06Q 20/16 705/40 |
| 2013/0166402 A1* | 6/2013 | Parento | ........... | G06Q 20/227 705/21 |
| 2014/0019352 A1* | 1/2014 | Shrivastava | ........... | G06Q 20/02 705/41 |
| 2014/0095383 A1* | 4/2014 | Rao | ........... | G06Q 20/32 705/43 |
| 2014/0108249 A1* | 4/2014 | Kulpati | ........... | G06Q 20/16 705/44 |
| 2014/0122301 A1* | 5/2014 | Tamassia | ........... | G06Q 20/12 705/26.82 |
| 2014/0136309 A1* | 5/2014 | Goldman | ........... | G06Q 30/0226 705/16 |
| 2014/0229380 A1* | 8/2014 | Duncan | ........... | G06Q 20/40145 713/186 |
| 2014/0324687 A1 | 10/2014 | Lovelett et al. | | |
| 2014/0344153 A1* | 11/2014 | Raj | ........... | G06Q 20/3821 705/44 |
| 2015/0019431 A1* | 1/2015 | Strasding | ........... | G06Q 20/407 705/44 |
| 2015/0032625 A1 | 1/2015 | Dill et al. | | |
| 2015/0112870 A1* | 4/2015 | Nagasundaram | .. | G06Q 20/3821 705/67 |
| 2015/0134539 A1 | 5/2015 | Kapur | | |
| 2015/0149336 A1* | 5/2015 | Haggerty | ........... | G06Q 20/425 705/35 |
| 2015/0178693 A1 | 6/2015 | Solis | | |
| 2015/0199679 A1 | 7/2015 | Palanisamy et al. | | |
| 2015/0199689 A1 | 7/2015 | Kumnick et al. | | |
| 2015/0254664 A1* | 9/2015 | Bondesen | ........... | G06Q 20/3821 705/44 |
| 2016/0028550 A1* | 1/2016 | Gaddam | ........... | H04L 63/0823 713/173 |
| 2016/0034889 A1 | 2/2016 | Downs et al. | | |
| 2016/0063487 A1* | 3/2016 | Moreton | ........... | G06Q 20/357 705/67 |
| 2016/0092872 A1* | 3/2016 | Prakash | ........... | G06Q 20/322 705/65 |
| 2016/0104155 A1* | 4/2016 | McGaugh | ........... | G06Q 20/405 705/65 |
| 2016/0267458 A1* | 9/2016 | Metral | ........... | G06Q 20/20 |

(56) References Cited

U.S. PATENT DOCUMENTS

| | | | | |
|---|---|---|---|---|
| 2017/0017958 | A1* | 1/2017 | Scott | G06Q 20/12 |
| 2017/0243213 | A1* | 8/2017 | Castinado | G06Q 20/327 |
| 2017/0330186 | A1* | 11/2017 | Vaughan | G06Q 20/409 |
| 2018/0018660 | A1* | 1/2018 | Gomes | G06Q 20/3678 |
| 2019/0356489 | A1* | 11/2019 | Palanisamy | H04L 63/0876 |
| 2021/0216991 | A1* | 7/2021 | Grassadonia | G06Q 20/3224 |

FOREIGN PATENT DOCUMENTS

| | | |
|---|---|---|
| CN | 105139193 A | 12/2015 |
| CN | 105493115 A | 4/2016 |
| CN | 105580038 A | 5/2016 |
| EP | 1482680 A1 | 12/2004 |
| GB | 2488059 A | 8/2012 |

OTHER PUBLICATIONS

A. Beikverdi, I. Kim and J. Song, "Centralized Payment System Using Social Networks Account," 2014 IEEE Fourth International Conference on Big Data and Cloud Computing, 2014, pp. 493-499, doi: 10.1109/BDCloud.2014.39. (Year: 2014).*

D. Jayasinghe, K. Markantonakis, I. Gurulian, R. N. Akram and K. Mayes, "Extending EMV Tokenised Payments to Offline-Environments," 2016 IEEE Trustcom/BigDataSE/ISPA, 2016, pp. 443-450, doi: 10.1109/TrustCom.2016.0095. (Year: 2016).*

L. Kyrillidis, K. Mayes, B. Chazalet and K. Markantonakis, "Card-Present Transactions on the Internet Using the Smart Card Web Server," 2013 12th IEEE International Conference on Trust, Security and Privacy in Computing and Communications, 2013, pp. 611-619, doi: 10.1109/TrustCom.2013.75. (Year: 2013).*

"Anonymous, ""System and Method for Enabling Split Digital Payment Instructions,"" IP.com No. IPCOM000225756D, 2013, IP.com Electronic Publication Date: Mar. 4, 2013" (Year: 2013).*

Anonymous, "Direct Debit from Bank Account Online Payment System,", IP.com prior art database, 2011, retrieved from https://priorart.ip.com/IPCOM/000208398 (Year: 2011).*

"PCT Search Report and Written Opinion", International Searching Authority, dated Sep. 4, 2017, for International Application No. PCT/US2017/037174, 12 pp.

European Search Report dated Dec. 2, 2019 which was issued in connection with EP Patent Application No. 17732681.6 which was filed on Jun. 13, 2017.

"Chinese First Office Action", by the Chinese National Intellectual Property Administration, dated Jun. 3, 2021, for Chinese Application No. 201780036094.X, 11pgs.

"Notification of Second Chinese Office Action", by the Chinese National Intellectual Property Administration, dated Jan. 13, 2022, for Chinese Application No. 201780036094.X, 10pgs.

"English-language Translation of Second Chinese Office Action", by the Chinese National Intellectual Property Administration, dated Jan. 13, 2022, for Chinese Application No. 201780036094.X, 10pgs.

"Notification of Rejection Decision", by the Chinese National Intellectual Property Administration, dated Apr. 26, 2022, for Chinese Application No. 201780036094.X, with English-language Translation 17pgs.

* cited by examiner

SYSTEM AND METHOD OF TOKENIZING DEPOSIT ACCOUNT NUMBERS FOR USE AT PAYMENT CARD ACCEPTANCE POINT

CROSS REFERENCE TO RELATED APPLICATIONS

This application claims the benefit of U.S. Provisional Patent Application Nos. 62/350,322 (filed on Jun. 15, 2016); 62/350,335 (filed Jun. 15, 2016); 62/350,407 (filed Jun. 15, 2016); 62/351,155 (filed Jun. 16, 2016); 62/350,821 (filed Jun. 16, 2016); 62/351,016 (filed Jun. 16, 2016); 62/351,227 (filed Jun. 16, 2016); 62/350,831 (filed Jun. 16, 2016); 62/350,416 (filed Jun. 15, 2016); and 62/351,164 (filed Jun. 16, 2016); the contents of which provisional applications are hereby incorporated by reference for all purposes.

BACKGROUND

The concept of "tokenization" for use in payment card account systems has been prominently advanced, notably in a document entitled "Payment Token Standard" or "Payment Token Interoperability Standard" published in November 2013 by Mastercard International Incorporated (which is the assignee hereof), Visa and American Express. In a nutshell, tokenization involves replacing a sensitive data element (such as a payment card account number or "PAN") with another identification number or proxy (called the "token" or "payment token") that does not directly point to the corresponding payment card account. According to some example scenarios, tokens may be provisioned for merchant "card on file" applications and/or for other purposes and/or carrying other limitations on their use, such as limited to a consumer device, limited to use with a given merchant, originator or recipient, or to a particular channel, duration, time of day, transaction type, etc. If the token is submitted in connection with a transaction that is not originating from a card on file arrangement, the system will detect that the transaction is likely improper and will decline the transaction. Thus, for example, if a wrongdoer were to obtain access to the token and use it to make a counterfeit payment card, "swipe" transactions involving the fake card would be rejected by the payment card account system.

In other use cases, tokens may be provisioned to digital wallets, payment-enabled mobile devices, etc., with similar improvements in security as that described above in connection with the card on file example. That is, if the source of a payment card account system transaction is different from the type of potential source to which the token (used for the transaction) has been provisioned, the transaction may be subject to rejection for security purposes on the assumption that the token has been compromised and is being misused.

The present inventors have now recognized that principles of tokenization may be usefully applied to allow holders of bank deposit accounts to access their accounts via transactions that originate at payment card acceptance points without requiring issuance of a conventional debit card account.

BRIEF DESCRIPTION OF THE DRAWINGS

Features and advantages of some embodiments of the present disclosure, and the manner in which the same are accomplished, will become more readily apparent upon consideration of the following detailed description of the invention taken in conjunction with the accompanying drawings, which illustrate preferred and example embodiments and which are not necessarily drawn to scale, wherein.

DESCRIPTION

In general, and for the purpose of introducing concepts of embodiments of the present disclosure, a holder of a bank account (e.g., checking account, savings account, investment account, current account, etc.) may request issuance of a token. The token may be generated and mapped to a shadow payment card account or shadow bank account or another proxy value encrypted or in clear, any of which, in turn, may be associated with the bank deposit account in question. The token may then be provisioned to the requesting user/account holder in a form that allows the user to present the token at one or more kinds of payment card acceptance points.

When a transaction is initiated by the user with the token, the token is translated, ultimately, to the user's deposit account. The deposit account is debited in the EFT system and a corresponding credit occurs for the benefit of the merchant.

Figure 1:
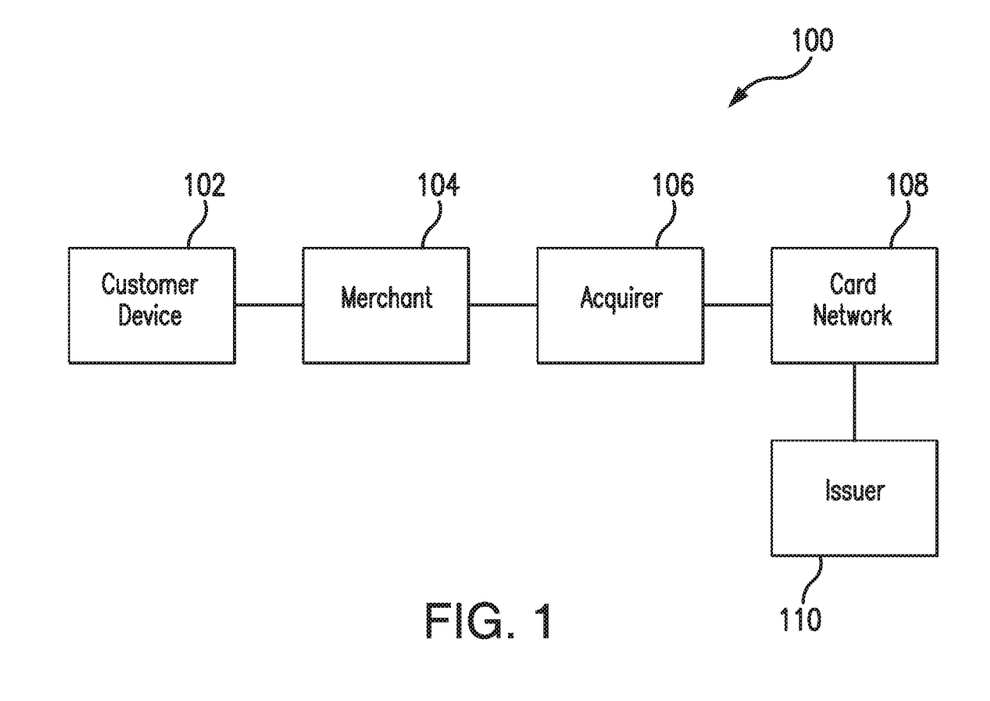
FIG. 1 is a block diagram of a payment card account system.

FIG. 1 is a block diagram that illustrates a payment card account system 100.

The system 100 includes a customer device 102 such as a magnetic stripe card, a payment IC (integrated circuit) card (contactless and/or contact), or a payment-enabled mobile device. Block 104 in FIG. 1 represents a merchant device such as a POS (point of sale) terminal/card reader. The merchant device 104 may also be considered part of the payment card account system 100. The customer device 102 may be presented to the merchant device 104, to consummate a purchase transaction and to permit the merchant device 104 to read payment card account data (including, e.g., a payment account number) from the customer device 102. In other situations, the merchant device 104 may be an e-commerce server computer, and the customer device 102 may be a personal computer, a mobile device running a mobile browser, etc.; in such situations, the customer device 102 may engage in an online shopping session with an e-commerce website hosted by the merchant device 104.

A computer 106 operated by an acquirer (acquiring financial institution) is also shown as part of the system 100 in FIG. 1. The acquirer computer 106 may receive a payment account system authorization request message for the transaction from the merchant device 104. The acquirer computer 106 may route the authorization request message via a card network 108 to a server computer 110 operated by the issuer of a payment account that is associated with the account number obtained by the merchant device 104 (e.g., from the customer device 102) and included in the authorization request message. The authorization response message generated by the payment issuer server computer 110 may be routed back to the merchant device 104 via the card network 108 and the acquirer computer 106.

One well known example of a card network is referred to as the "Banknet" system, and is operated by Mastercard International Incorporated, which is the assignee hereof.

The payment account issuer server computer 110 may be operated by or on behalf of a financial institution ("FI") that issues payment accounts to individual users such as the customer who presented or operated the customer device 102 referred to above. For example, the payment card issuer server computer 110 may perform such functions as (a) receiving and responding to requests for authorization of payment account transactions to be charged to payment accounts issued by the FI; and (b) tracking and storing transactions and maintaining account records.

The payment card account system communications among the merchants, acquirers, card network and/or issuers may conform to a known standard such as ISO 8583.

The components of the system 100 as depicted in FIG. 1 are only those that are needed for processing a single transaction. A typical payment system may process many purchase transactions (including simultaneous transactions) and may include a considerable number of payment account issuers and their computers, a considerable number of acquirers and their computers, and numerous merchants and their devices, as well as a very large number of customer devices.

Figure 2:
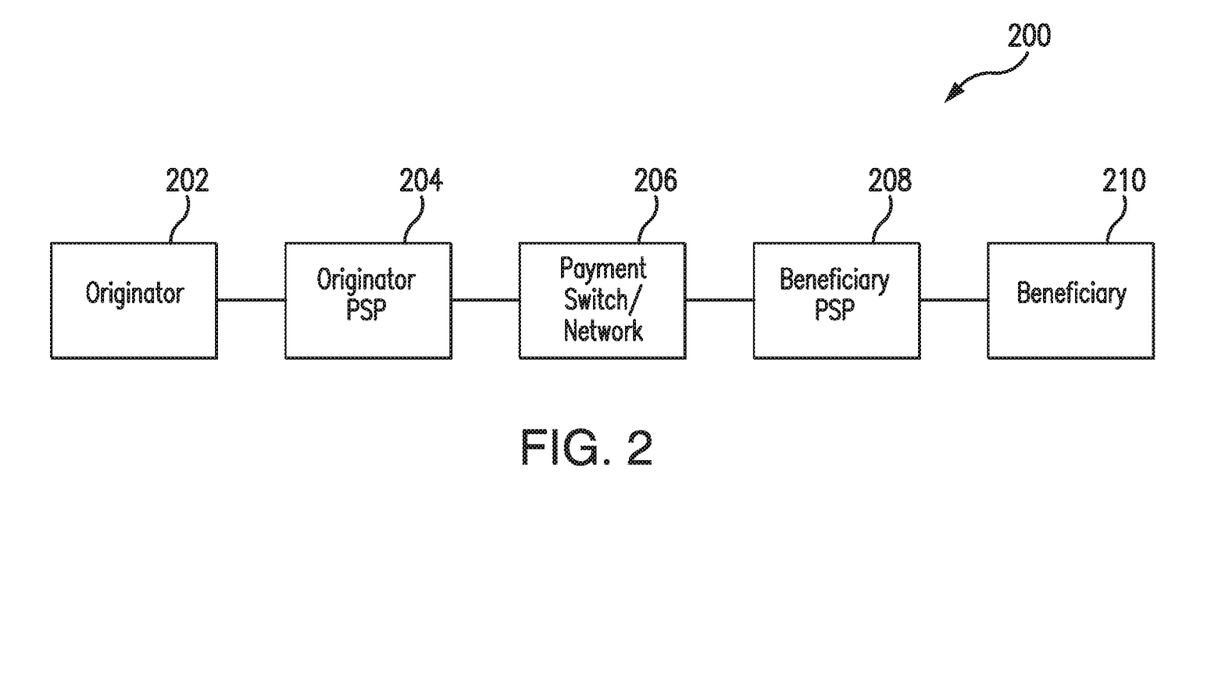
FIG. 2 is block diagram of a payment system such as an EFT (electronic funds transfer) system.

FIG. 2 is a block diagram that illustrates a payment network system 200, of which one example is the ACH (automated clearing house) system operated in the United States.

The system 200 includes an originator device 202, which may be a computer operated by an originator of a transaction. Common kinds of transactions are credit transactions and debit transactions. The originator is the party that initiates the transaction. The originator may be, for example, an individual or a corporation or other organization.

The system 200 further includes an originator PSP (payment services provider) computer 204. The originator PSP computer 204 receives payment instructions from the originator and forwards data entries that reflect the instructions to a payment system switch/network 206, which is also part of the system 200. The originator PSP computer 204 may be operated by an originator PSP of which the originator is a customer. The switch/network 206 may be operated by a governmental or private entity that serves as a clearing facility for the system 200.

Also included in the system 200 is a beneficiary PSP computer 208. The beneficiary PSP computer 208 receives entries from the payment system switch/network 206 and posts entries to accounts of depositors.

Still further, the system 200 includes a beneficiary 210 that is one of the depositors of the beneficiary PSP. In the case of a credit transaction, the account at the beneficiary PSP of the beneficiary may be credited with the amount instructed to be paid by the originator device 202. The beneficiary may be, for example, an individual or a corporation or other organization. Both PSPs may typically be banks or other financial institutions (FIs).

The communications among the parties in the system 200 may typically be conducted using XML (eXtensible Markup Language) and may comply with a standard according to ISO 20022.

The components of the system 200 as depicted in FIG. 2 are only those that are needed for processing a single transaction. A typical payment network system may process many transactions (including simultaneous transactions) and may include a considerable number of PSPs and their computers, one or more clearing operators, and numerous originators and beneficiaries FIG. 3 is a block diagram of a payment transaction system 300 provided in accordance with aspects of the present disclosure.

The payment transaction system 300 may include a customer device 302 which the customer/user employs to initiate a transaction. The customer device 302 may be, for example, a card-shaped item that resembles a conventional payment card in terms of its interaction with the card reader component of a POS terminal (the latter being one example of a device utilized by a merchant/originator 304, shown in FIG. 3). Alternatively, the customer device 302 may be a payment-enabled mobile device, or a personal computer or browser-equipped mobile device by which the customer may access an online shopping website hosted by an e-commerce web server computer (the latter being another example of a device that may be utilized by the merchant/originator 304).

Figure 3:
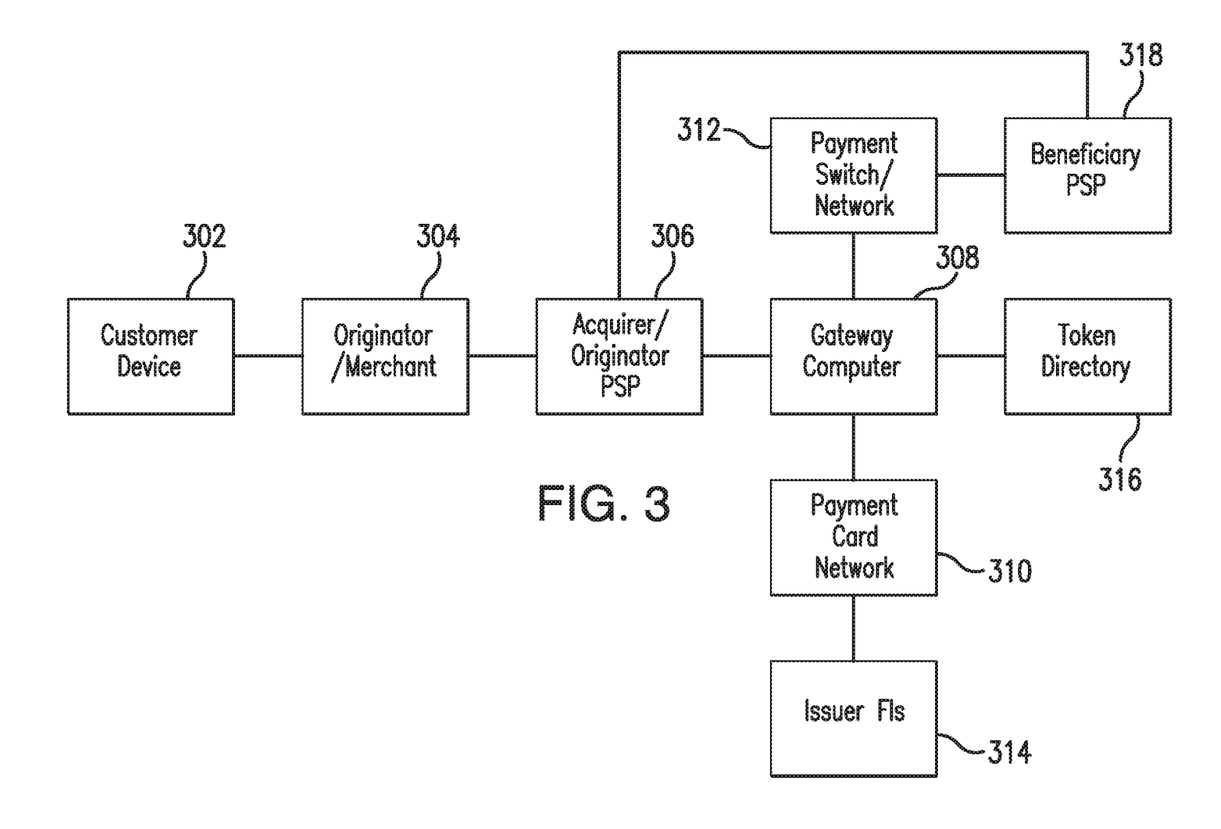
FIG. 3 is a block diagram of a payment transaction system provided in accordance with aspects of the present disclosure.

An originator payment services provider (PSP)/acquirer 306 is shown in FIG. 3 in communication with the merchant/originator 304, and also in communication with a gateway computer 308. The gateway computer 308, in turn, is shown operably connected between a payment card network 310 and a payment switch/network 312. Although the gateway computer 308 is shown separately from the payment card network 310, it may, in some embodiments, be a component or components associated with and/or provided by and/or operated by the operator of the payment card network 310. The payment card network 310 may generally resemble and provide functionality like that of the card network 108 shown in and discussed in connection with FIG. 1. The payment switch/network 312 may generally resemble and provide functionality like that of the payment switch/network 206 shown in and discussed in connection with FIG. 2.

In some embodiments, the gateway computer 308 is configured to bridge the payment switch/network 312 and the payment card network 310. This may occur at the application layer level and/or the presentation layer level. The gateway computer 308 may serve as a central switching platform that is the seat of the interrelated operations of the networks 310 and 312 and may work independently of the chosen protocol of the network participants.

The payment card network 310 is shown in FIG. 3 as providing routing services for routing of payment card account system transactions to account issuers/FIs (financial institutions) 314. The issuer FIs 314 may operate substantially as described above with respect to the issuer 110 shown in and discussed in connection with FIG. 1.

The gateway computer 308 is also shown connected to a token directory 316. In some embodiments, the token directory 316 may be associated with/operated by the operator of the payment card network 310. The gateway computer 308 may interact with the token directory 316 to obtain translation of payment tokens included in transaction messages received by the gateway computer 308.

The payment network/switch 312 is in communication with a beneficiary PSP 318, which may be a bank or other financial institution (FI) at which the customer's deposit account is maintained. The beneficiary PSP 312 is also in communication (directly or indirectly) with the originator PSP 306.

Any one or more of the blocks shown in FIG. 3, in addition to representing the indicated entity, may also be considered to represent one or more computer systems operated by such entity.

Figure 4:
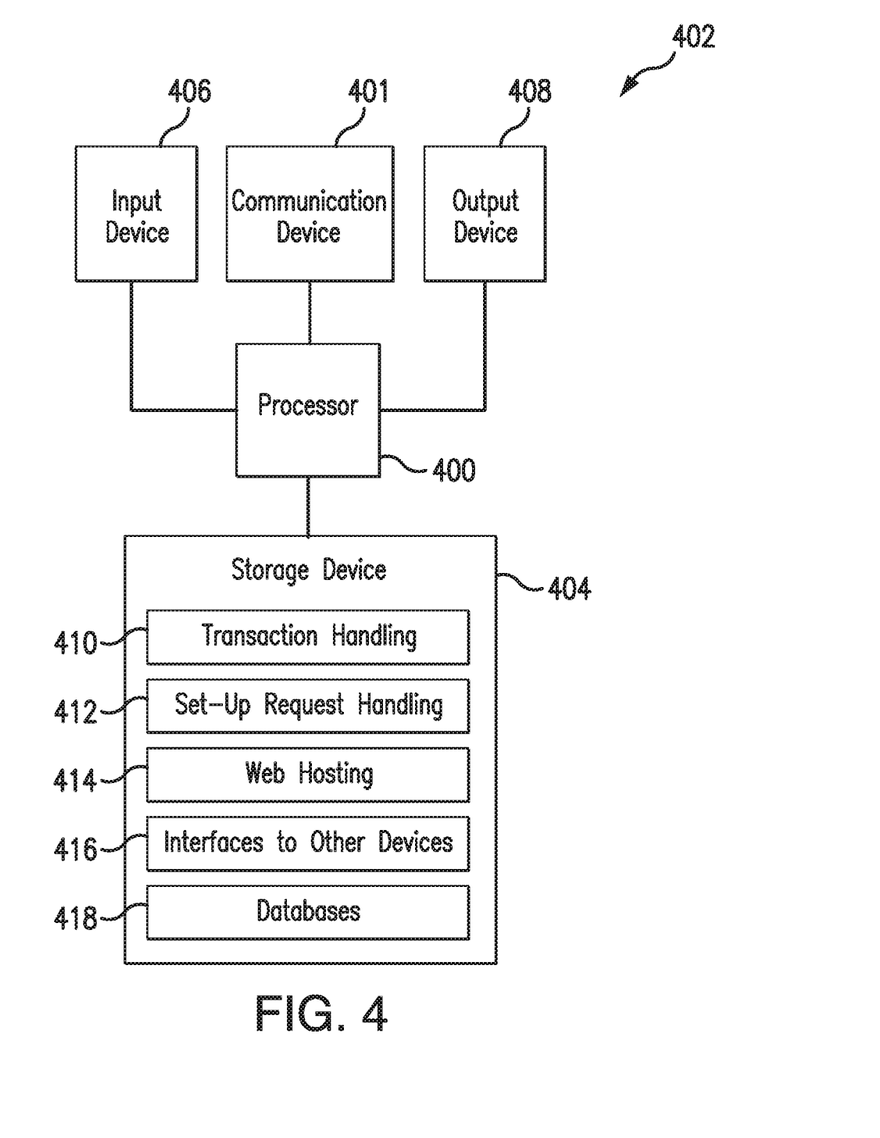
FIGS. 4 and 5 are block diagrams of example computer systems that may perform functions in the system of FIG. 3.

FIG. 4 is a block diagram of an example computer system 402 that may perform functions in the system of FIG. 3. The computer system 402 will nominally be referred to as a "beneficiary PSP computer system", although some or all of the functions ascribed to it may be performed by computer systems operated by or associated with the payment switch network 312, the payment card network/token directory 316 and/or the originator PSP 306.

Referring now to FIG. 4, the beneficiary PSP computer system 402 may, in its hardware aspects, resemble a typical server computer and/or mainframe computer, but may be controlled by software to cause it to function as described herein.

The beneficiary PSP computer system 402 may include a computer processor 400 operatively coupled to a communication device 401, a storage device 404, an input device 406 and an output device 408. The communications device 401, the storage device 404, the input device 406 and the output device 408 may all be in communication with the processor 400.

The computer processor 400 may be constituted by one or more processors. Processor 400 operates to execute processor-executable steps, contained in program instructions described below, so as to control the beneficiary PSP computer system 402 to provide desired functionality.

Communication device 401 may be used to facilitate communication with, for example, other devices (such as other components of the payment system 300, as well as mobile devices and/or computing devices operated by account holders). Communication device 401 may comprise numerous communication ports (not separately shown), to allow the beneficiary PSP computer system 402 to communicate simultaneously with a number of other computers and other devices, including communications as required to simultaneously handle numerous interactions with other devices and/or numerous transactions.

Input device 406 may comprise one or more of any type of peripheral device typically used to input data into a computer. For example, the input device 406 may include a keyboard and a mouse. Output device 408 may comprise, for example, a display and/or a printer.

Storage device 404 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 404 stores one or more programs for controlling processor 400. The programs comprise program instructions (which may be referred to as computer readable program code means) that contain processor-executable process steps of the beneficiary PSP computer system 402, executed by the processor 400 (and/or executed by other processors) to cause the beneficiary PSP computer system 402 (and/or other computer systems) to function as described herein.

The programs may include one or more conventional operating systems (not shown) that control the processor 400 so as to manage and coordinate activities and sharing of resources in the beneficiary PSP computer system 402, and to serve as a host for application programs (described below) that run on the beneficiary PSP computer system 402.

The programs stored in the storage device 404 may include, for example, a transaction handling application program 410. The transaction handling application program 410 may operate to handle transactions in a manner or manners to be described below.

Another program that may be stored in the storage device 404 is an application program 412 for handling set-up requests received from deposit account holders. The purpose of the set-up requests may be to request tokenization of the deposit accounts held by the requesting individuals. Details of handling of set-up requests will also be described below.

The storage device 404 may also store web hosting software 414. The web hosting software 414 may control the processor 400 to enable the beneficiary PSP computer system 402 to maintain a website by which account holders may access and interact with the beneficiary PSP computer system 402.

The storage device 404 may further store one or more software modules (block 416) that serve as software interfaces between the beneficiary PSP computer system 402 and one or more other components of the system 300 and/or devices operated by account holders.

The storage device 404 may also store, and the beneficiary PSP computer system 402 may also execute, other programs, which are not shown. For example, such programs may include communications software and a reporting application. The latter program may respond to requests from system administrators for reports on the activities performed by the beneficiary PSP computer system 402. The other programs may also include, e.g., device drivers, database management software, etc.

The storage device 404 may also store one or more databases 418 needed for operation of the beneficiary PSP computer system 402.

Figure 5:
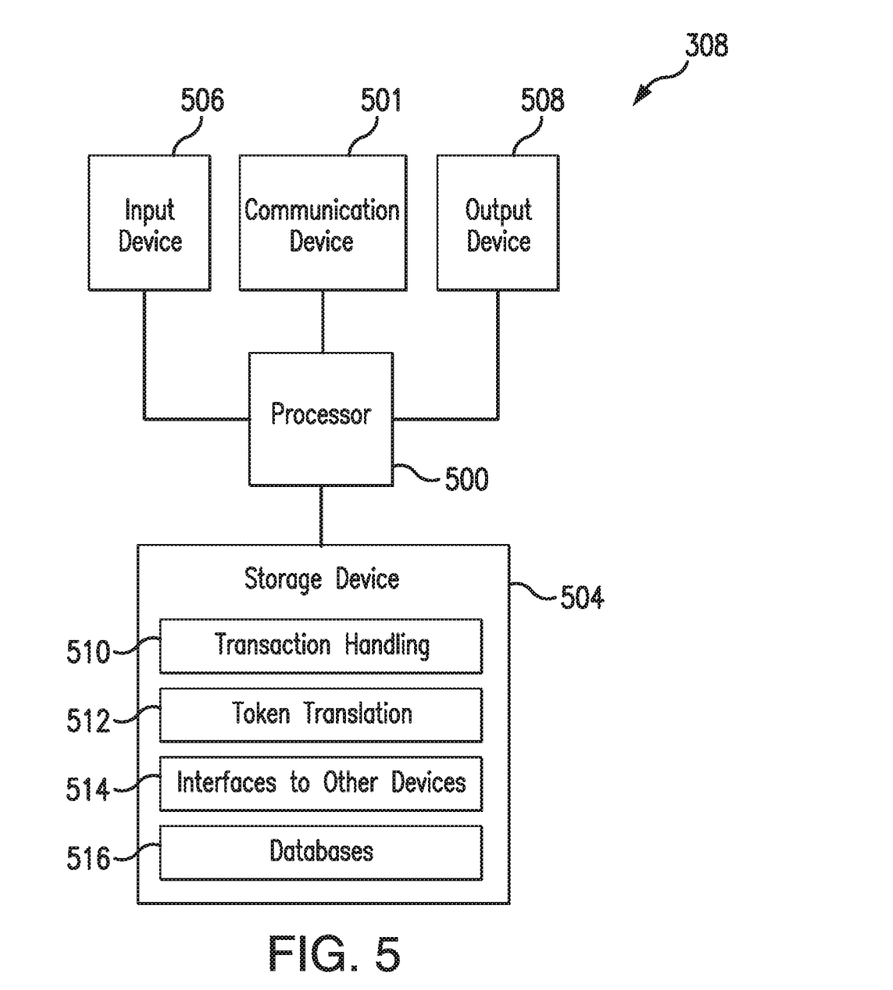

FIG. 5 is a block diagram that illustrates an example embodiment of the gateway computer 308. The gateway computer 308 may be similar in its hardware aspects to the beneficiary PSP computer system 402 that was just described. Accordingly, the gateway computer 308 may include a processor 500 in communication with a communication device 501, a storage device 504, an input device 506 and an output device 508.

Storage device 504 stores one or more programs for controlling processor 500. The programs comprise program instructions (which may be referred to as computer readable program code means) that contain processor-executable process steps of the gateway computer 308, executed by the processor 500 (and/or executed by other processors) to cause the gateway computer 308 (and/or other computer systems) to function as described herein.

The programs may include one or more conventional operating systems (not shown) that control the processor 500 so as to manage and coordinate activities and sharing of resources in the gateway computer 308, and to serve as a host for application programs (described below) that run on the gateway computer 308.

The programs stored in the storage device 504 may include, for example, a transaction handling application program 510. The transaction handling application program 510 may control the processor 500 to enable the gateway computer 308 to handle transactions in a manner or manners to be described below.

Another program that may be stored in the storage device 504 is an application program 512 for handling translation of payment tokens received by the gateway computer 308 in connection with transaction requests. Details of token translation will be provided below.

The storage device 504 may further store one or more software modules (block 514) that serve as software interfaces between the gateway computer 308 and one or more other components of the system 300, including the token directory 316 (FIG. 3).

Continuing to refer to FIG. 5, the storage device 504 may also store, and the gateway computer 308 may also execute, other programs, which are not shown. For example, such programs may include communications software and a reporting application. The latter program may respond to requests from system administrators for reports on the activities performed by the gateway computer 308. The other programs may also include, e.g., device drivers, database management software, etc.

The storage device 504 may also store one or more databases 516 needed for operation of the gateway computer 308.

Other computerized components of the system 300 (FIG. 3) may be constituted by computer hardware having the same type of components and hardware architecture as described herein with reference to FIG. 4.

Figure 6:
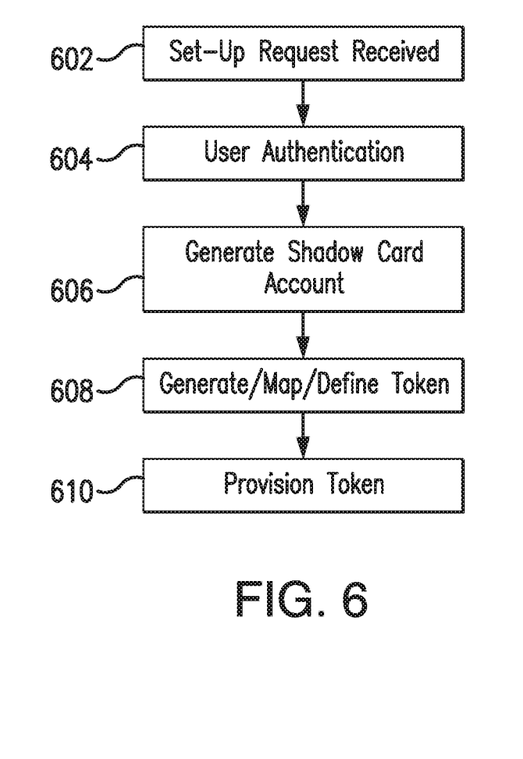
FIGS. 6 and 7 are flow charts that illustrate processes that may be performed in the system of FIG. 3 in accordance with aspects of the present disclosure.

FIG. 6 is a flow chart that illustrates a process that may be performed in the system of FIG. 3 in accordance with aspects of the present disclosure. In particular, the process of FIG. 6 relates to handling a request for set-up/tokenization/provisioning of a deposit account.

At 602 in FIG. 6 a user request is received for set-up and provisioning of a token to represent the user's deposit account. The user request may be received via any one of a number of channels, including but not limited to mobile phone apps, web based portals, merchant card on file systems, digital wallets, mobile browsers or web-browsing PCs, or over the counter.

At 604, user authentication may take place. This may be done in any manner that the beneficiary PSP deems to be prudent. For example, submission and verification of a PIN may be employed, or the user may submit and the beneficiary PSP may verify a biometric measure. More generally, if deemed appropriate or necessary, ID&V (identification and verification) procedures like those used in connection with payment card account provisioning may be employed to obtain reasonable assurance of user authentication. In a face-to-face environment, a photo i.d. may be used to authenticate the consumer while registering the consumer into the program.

At 606, a shadow payment card account may be generated and mapped to the user's chosen funding deposit account (which may be a current account or a savings account). The shadow payment card account may be represented by a "funding primary account number" (FPAN). This may occur pursuant to a request to a token service provider (not shown), which may be or be under common operation with the payment card network 310. This may be initiated by an API (application program interface) call from the beneficiary PSP computer system 402 to the token service provider. A set of suitable cryptographic keys may be issued at the same time to implement cryptogram-based security in connection with use of the shadow payment card account/token. The FPAN may be in a standard format for account numbers in a payment card account system.

At 608, a token may be generated against the shadow payment card account and restricted to the channel for which it was requested. At this point, the token represents a generic payment card account that can be accepted within the domain of payment card networks for a given channel (i.e., the channel specified in the request and defined as acceptable for use of the token). The token may be a string of digits in a format used for payment card account numbers in a payment card account system. For example, the token may consist of 16 digits, like many payment card account numbers. The token may be mapped directly or indirectly to the user's bank deposit account.

At 610, the token is provisioned (i.e., made available to the user). The provisioning may take a number of different forms depending on what the requested channel was. For example, the token may be downloaded to a mobile device for contactless payment at a point of sale and in-app payments. In other embodiments, the token may be stored "in the cloud" for remote accessing via a payment/wallet app in the payment-enabled mobile device. Alternatively, the token can be loaded into a merchant card on file system for subsequent payments for that specific merchant. As still another alternative, the token can be loaded to a digital wallet or used for instant issuance of a plastic payment card for use at any physical card accepting merchant point of sale.

Figure 7:
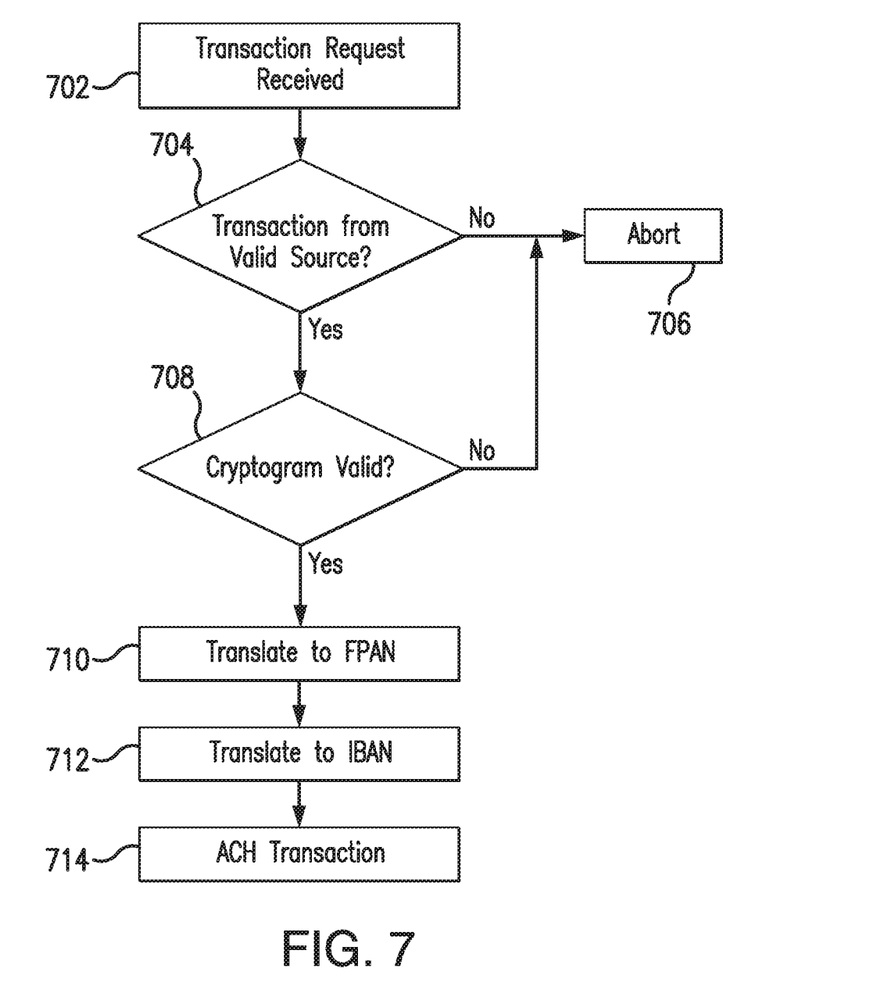

FIG. 7 is a flow chart that illustrates a process that may be performed in the system of FIG. 3 in accordance with aspects of the present disclosure. In particular, the process of FIG. 7 relates to handling a request for a transaction that involves a token requested and provisioned per the process of FIG. 6. The process of FIG. 7 may be entirely or primarily performed in the gateway computer 308.

At 702, a transaction request is received at the gateway computer 308 involving the type of token referred to in connection with FIG. 6. The transaction request may have been received at the gateway computer 308 from the originator PSP 306. Alternatively, the transaction request may have been received at the gateway computer 308 via the payment card network 310 after being routed from the originator PSP 306. The routing of the transaction request may be based on the payment token contained therein. More specifically, the payment token may contain a BIN (bank identification number) portion that indicates that the token represents a deposit account, and the transaction request may be routed accordingly for translation of the token to a deposit account number and handling via the payment switch/network 312, as described herein.

After block 702, some security steps typically involved in detokenization may ensue. Thus, at decision block 704, the gateway computer 308 may determine whether the transaction originated from a source/channel that is consistent with the manner in which the token was provisioned. For example, if the token had been provisioned to a payment-enabled mobile device, it may be determined at decision block 704 whether the transaction indicates it originated from such a device.

If a negative determination is made at decision block 704, then the transaction may be declined/aborted, as indicated at block 706.

If a positive determination is made at decision block 704, then the process of FIG. 7 may advance from decision block 704 to decision block 708. At decision block 708, the gateway computer 308 may determine whether a cryptogram submitted as part of the transaction request can be verified. If not, again, the transaction may be declined/aborted.

However, if it is determined at decision block 708 that the cryptogram is valid, then the process of FIG. 7 may advance from decision block 708 to block 710.

At block 710, the token is translated (e.g., at the token directory 316, FIG. 3; e.g., at the request of the gateway computer 308) to the FPAN that represents the associated shadow payment account. Then, at 712, the FPAN is translated to the relevant deposit account number, which may be in an IBAN (international bank account number) format. Both the FPAN and the deposit account numbers may be referred to as "funding account indicators" in that they directly or indirectly represent the user's deposit account.

At 714, the transaction request is routed from the gateway computer 308 to the payment switch/network 312 for execution of an ACH (automated clearing house) or other EFT (electronic funds transfer) transaction. In the ACH transaction, the deposit account of the individual to whom the token was provisioned is debited for the transaction amount in the ACH network. In some embodiments, a push transaction from the user's deposit account to the merchant's deposit account may occur. Alternatively, the funds from the user's deposit account may be held for clearing to the merchant via the payment card account network. The translation and account debit/credit operations may occur behind the scenes between the networks through bridging of the two systems and in a manner that is transparent to the user.

In some embodiments, the gateway computer 308 may route the transaction for execution to the beneficiary PSP 318 or the originator PSP 316 instead of forwarding the transaction to the payment switch/network 312.

In some embodiments, the token may be translated directly to the deposit account (IBAN) number, without the intermediate translation to the FPAN, and in fact in such embodiments, no FPAN may be generated in connection with the generation/assignment of the token. However, intermediate translation to the FPAN may provide benefits, such as permitting utilization of payment card network based services, including, for example, fraud management, transaction alerts/controls, etc.

With arrangements as described herein, any deposit account holder may be issued a token that can be used at any acceptance point (subject to channel restrictions defined for the token) of a given payment card network. It may be the case that no changes are required at the existing acceptance points. EFT access to deposit accounts is thus extended to the widely available array of payment card account acceptance points. It also is not necessary to engage in the administrative processing that accompanies issuance of a debit card account.

The transaction process described herein may include and/or be part of one or more different alternative network flows according to various use cases.

According to one alternative network flow, a virtual or physical merchant card acceptance terminal initiates a transaction that is transmitted via a merchant system. Prior to transmitting the request, the merchant system may evaluate the payment credentials, and if the same are tokenized, may call a detokenization service provided by a Token Service Provider. Also prior to transmitting the request, the merchant system may determine the originator PSP (O-PSP), and build the transaction request message. The transaction request message is then submitted by the merchant system to the O-PSP. The O-PSP evaluates the transaction request message and authenticates the consumer credentials and debits the originator/consumer account. The flow then proceeds to the payment network (EFT network), which determines the routing path and routes to the beneficiary PSP (B-PSP). The B-PSP evaluates the messages, checks the validity of the beneficiary account, authorizes the transaction request message and posts the transaction (immediately or at a later point in time) against the beneficiary account. The B-PSP returns a response message to the O-PSP via the payment network (EFT network). The O-PSP returns the response to the merchant system/merchant card acceptance terminal.

According to another alternative network flow, a virtual or physical merchant card acceptance terminal initiates a transaction that is transmitted via a merchant system. The merchant system builds and submits the transaction request message to the merchant acquirer. The merchant acquirer may evaluate the payment credentials in the message, and if the same are tokenized, may call a detokenization service provided by a Token Service Provider. The merchant acquirer may determine the O-PSP and transmit the message to the O-PSP. The O-PSP evaluates the transaction request message and authenticates the consumer credentials and debits the originator/consumer account. The O-PSP also routes the message to the payment network (EFT network). The payment network determines the routing path and routes the message to the B-PSP. The B-PSP evaluates the message, checks the validity of the beneficiary account, authorizes the transaction request message and posts the transaction (immediately or at a later point in time) against the beneficiary account. The B-PSP returns a response message to the O-PSP via the payment network (EFT network). The O-PSP returns the response to the merchant system/merchant card acceptance terminal.

According to still another alternative network flow, a virtual or physical merchant card acceptance terminal initiates a transaction that is transmitted via a merchant system. The merchant system builds and submits the transaction request message to the merchant acquirer. The merchant acquirer may evaluate the payment credentials in the message, and may determine the payment network (EFT network). The payment network may evaluate the message and evaluate the payment credentials in the message, and if the same are tokenized, may call a detokenization service provided by a Token Service Provider. Further, the payment network may determine the O-PSP and transmit the message to the O-PSP. The O-PSP may evaluate the message and authenticate the consumer credentials and debit the originator/consumer account. Also, the O-PSP may return the response to the payment network, which determines the routing path and routes the message to the B-PSP. The B-PSP evaluates the message, checks the validity of the beneficiary account, authorizes the transaction request message and posts the transaction (immediately or at a later point in time) against the beneficiary account. The B-PSP returns a response message to the O-PSP via the payment network (EFT network). The O-PSP returns the response to the merchant system/merchant card acceptance terminal.

The card acceptance interface for a remote transaction (such as an in-app transaction or an online transaction) may be a browser or mobile application utilizing manual entry of the token or other transaction information or the token may be supplied via a digital wallet. In such remote transactions, the user may provide payment credentials and other transaction-related information (name, billing address, shipping address, etc.) to complete the transaction either during the checkout process or with the information having been stored during enrollment (e.g., via a digital wallet).

When the user engages in checkout from such an interface using a deposit account as the underlying source of funds, any one of the above alternative transaction flows may occur in various use cases. As another alternative, the following further alternative flow may take place.

Via the merchant device a digital wallet acceptance interface may be invoked, with user/customer authentication or with the customer pre-authenticated. The digital wallet provider may evaluate the payment credentials, and if the same are tokenized, may call a detokenization service provided by a Token Service Provider. The digital wallet provider determines the O-PSP and builds and submits a transaction request message to the O-PSP. The O-PSP evaluates the message and authenticates the consumer credentials and then forwards the message to the payment network (EFT network). The payment network determines the routing path and routes the message to the B-PSP. The B-PSP evaluates the message, checks the validity of the beneficiary account, authorizes the transaction request message and posts the transaction (immediately or at a later point in time) against the beneficiary account. The B-PSP returns a response message to the O-PSP via the payment network (EFT network). The O-PSP returns the response message to the merchant via the payment network and via the digital wallet provider. The merchant may also receive other information such as billing address, shipping address, and loyalty account information in addition to a payment confirmation message.

There may be intermediate steps in the above flow, where the digital wallet provider may act as B-PSP for the funding leg of the transaction, with the consumer originator account being debited and a B-PSP account (which can be a pooled account) of the digital wallet provider posted and credited. In the payment leg of the transaction, the digital wallet provider may act as O-PSP of the transaction where the digital wallet provider account is debited and the B-PSP account of the beneficiary will be posted and credited.

In some embodiments, the payment credentials may be a bank account number and bank routing information (IBAN, IFSC code, SWIFT code, etc.) and/or card number (credit, debit, prepaid, commercial, or a push card instrument tied to a deposit account). Mapping of tokens and payment credentials may allow for the merchant only to see the token and not the real payment credentials.

In some embodiments, when the token is issued to the account holder, it may be provisioned to a wallet application ("app") that runs on the account holder's payment-enabled mobile device, or to the account holder's wallet partition in a wallet service provider (WSP) computer. In some embodiments, a wallet service provider, or an account issuer acting as a WSP, may make the request for tokenization of the account holder's deposit account.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

As used herein and in the appended claims, a "server" includes a computer device or system that responds to numerous requests for service from other devices.

The above descriptions and illustrations of processes herein should not be considered to imply a fixed order for performing the process steps. Rather, the process steps may be performed in any order that is practicable, including simultaneous performance of at least some steps.

As used herein and in the appended claims, the term "payment card system account" includes a credit card account, a deposit account that the account holder may access using a debit card, a prepaid card account, or any other type of account from which payment transactions may be consummated. The terms "payment card system account" and "payment card account" and "payment account" are used interchangeably herein. The term "payment card account number" includes a number that identifies a payment card system account or a number carried by a payment card, or a number that is used to route a transaction in a payment system that handles payment card transactions. The term "payment card" includes a credit card, debit card, prepaid card, or other type of payment instrument, whether an actual physical card, electronic, or virtual.

As used herein and in the appended claims, the term "payment card system," "payment card account system" or "payment account system" refers to a system for handling purchase transactions and related transactions. An example of such a system is the one operated by MasterCard International Incorporated, the assignee of the present disclosure. In some embodiments, the term "payment card system" may be limited to systems in which member financial institutions issue payment card accounts to individuals, businesses and/or other organizations.

Although the present invention has been described in connection with specific example embodiments, it should be understood that various changes, substitutions, and alterations apparent to those skilled in the art can be made to the disclosed embodiments without departing from the spirit and scope of the invention as set forth in the appended claims.

What is claimed is:

1. A method of routing a payment transaction, the method comprising:

generating a shadow payment card account in response to a token set-up request;

mapping the generated shadow payment card account to a bank deposit account of an account holder, wherein a bank deposit account number identifies the bank deposit account;

provisioning a payment token for the shadow payment card account, wherein the payment token is directly mapped to the bank deposit account of the account holder;

restricting the payment token to a channel specified in the token set-up request;

receiving, at a gateway computer connected between a payment switch, a payment card network, and a token directory, a transaction request message via the payment card network, the transaction request message including the payment token and cryptogram, wherein the cryptogram is separate from the payment token;

determining, by the gateway computer, the transaction request message was initiated with a payment-enabled device channel and the payment-enabled device channel is a same source channel to which the payment token was provisioned;

in response to determining the transaction originated from the same source channel to which the payment token was provisioned, verifying the cryptogram submitted with the transaction request message;

translating the payment token into a funding account indicator, the funding account indicator as the bank deposit account number, the funding account indicator in a format defined for payment card account numbers, said format defined by a payment account system, the funding account indicator different from the payment token, wherein the payment token is translated into the funding account indicator by the token directory at the request of the gateway computer;

transmitting, by the gateway computer to the payment switch, an EFT (electronic funds transfer) message to initiate an EFT transaction to be funded from said bank deposit account of the account holder, the EFT message including the bank deposit account number; and performing said EFT transaction in an ACH (automated clearing house) system.

2. The method of claim 1, wherein said payment token is in said format defined for payment card account numbers.

3. The method of claim 2, wherein said format defined for payment card account numbers requires said payment card account numbers to consist of a fixed pre-determined number of decimal digits.

4. The method of claim 3, wherein said fixed pre-determined number of decimal digits is 16 decimal digits.

5. The method of claim 2, wherein said payment token includes a BIN (bank identification number) portion.

6. The method of claim 5, wherein said BIN portion of said payment token indicates that the payment token is for accessing an EFT system.

7. The method of claim 1, wherein said bank account number is in an IBAN (International Bank Account Number) format.

8. The method of claim 1, wherein the transmitting step includes transmitting the EFT message to an EFT network switch.

9. The method of claim 1, wherein the EFT message includes a transaction amount.

10. The method of claim 1, wherein the EFT message includes a recipient account identifier, the recipient account identifier identifying a financial account belonging to a merchant.

* * * * *